B. T. B. HYDE & A. GAUL, Jr.
AEROPLANE.
APPLICATION FILED MAY 17, 1912.
1,048,835. Patented Dec. 31, 1912.
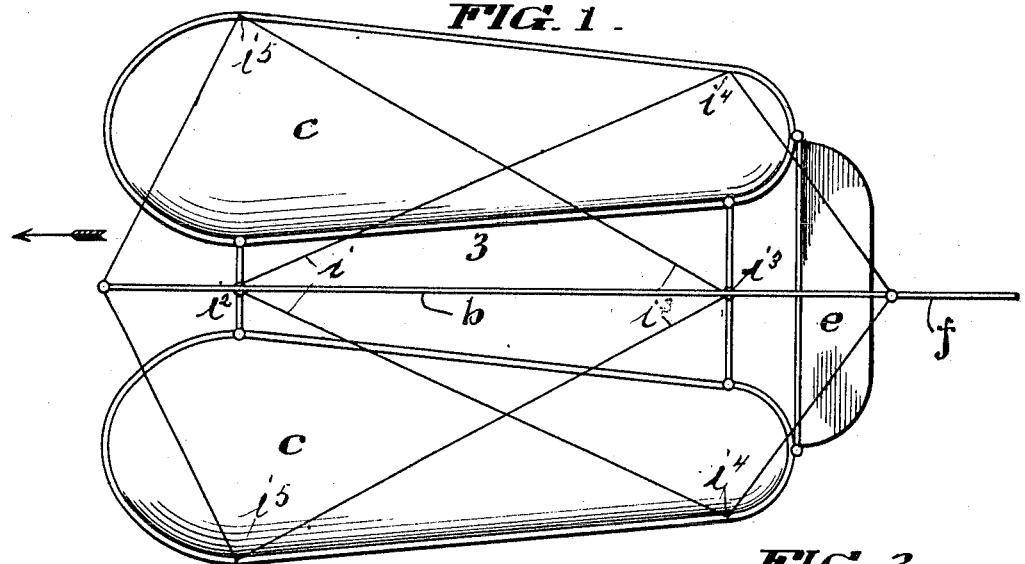
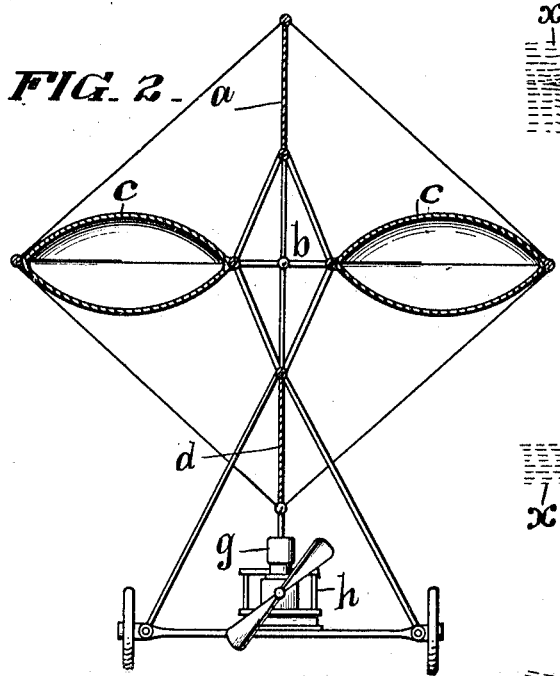
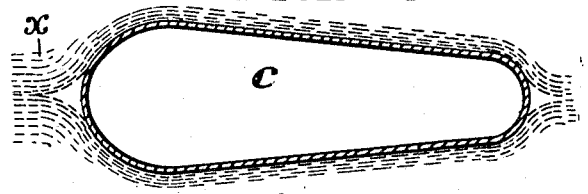
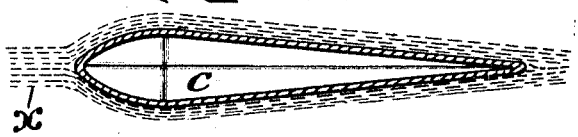
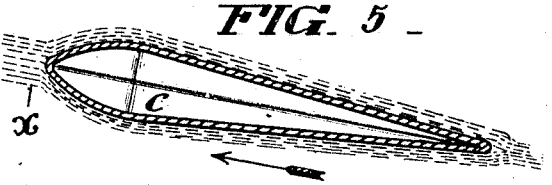
WITNESSES
Thomas M. Smith
Helen F. Miller
INVENTORS
Benjamin T. B. Hyde
and Andrew Gaul Jr.
BY
J. Walter Douglas
ATTORNEY

UNITED STATES PATENT OFFICE.

BENJAMIN T. BABBITT HYDE, OF NEW YORK, N. Y., AND ANDREW GAUL, JR., OF RIDGEFIELD, NEW JERSEY.

AEROPLANE.

1,048,835. Specification of Letters Patent. Patented Dec. 31, 1912.

Application filed May 17, 1912. Serial No. 697,841.

*To all whom it may concern:*

Be it known that we, BENJAMIN T. BABBITT HYDE and ANDREW GAUL, Jr., both citizens of the United States, respectively residing at New York, in the county of New York and State of New York, and at Ridgefield, in the county of Bergen and State of New Jersey, have jointly invented certain new and useful Improvements in Aeroplanes, of which the following is a specification.

Our present invention has relation to certain improvements in the constructive arrangement of an aeroplane of types forming the subject-matter of United States Letters Patent, granted to us under the No. 1,002,203, dated August 29th, 1911; and in such connection our present invention relates in particular to the shape and arrangement of the stabilizing fins as well as the carrying wings or planes of the structure, to sustain a greater load weight per square foot, viewed in respect to the entire area of the structure, and increased lifting power at a greater economy in horse power employed as compared to structures hitherto built of less weight, but expending a greater horse power in lifting and carrying the same.

It is a recognized fact that the faster an aeroplane travels, the greater weight it will carry. It has long been supposed that unless the carrying wings or planes were given considerable camber they would be practically ineffectual in lifting and carrying an aeroplane, but such theory has been exploded, but it is a fact that flat plane carrying wings or planes move through the air at greater speed and with the expenditure of less horse power than other shaped wings or planes, so long as flights are confined to movements in substantially a horizontal plane, or so long as the aeroplane is maintained in a horizontal position, but the trouble has been to uniformly maintain an aeroplane in flights in such condition for more than a second or so at a time, for as soon as such departs or assumes a slanting plane, head resistance is encountered with its retarding influence with respect to the speed of the aeroplane; and therefore, one of the principal objects of our present invention by the present arrangement is to provide an aeroplane in which practically, back suction is avoided; and further in which the aeroplane can be driven at greater speed with less horse power per square foot than heretofore was possible; and also with far better carrying power and more uniform stabilizing under variable encountering conditions thereof.

A further object of our invention is not only the accomplishing of the above defined advantageous features in an aeroplane but also better stability of the shaft in the air both as to vertical and lateral performances in the presence of surrounding air currents and better sustained carrying load, with increased speed at a reduction in actual horse power required per square foot of surface.

The nature, scope and characteristic features of our present invention will be more fully understood from the following description taken in connection with the accompanying drawings forming part hereof, in which—

Figure 1, is a top or plan view of an aeroplane embodying the defined main features in constructive arrangement of an aeroplane of our said invention. Fig. 2, is a vertical central sectional view of the aeroplane of Fig. 1. Fig. 3, is a horizontal central cross-sectional view, showing the form or shape of one of the carrying wings or planes, as illustrated in Fig. 2. Fig. 4, is a vertical sectional view fore and aft of one of the carrying wings or planes, showing by structural arrangement, coursings pursued while traveling in a horizontal plane, as indicated by the dot outlining; and Fig. 5, is a similar view of one of the carrying wings or planes in an inclining course, the latter being indicated in dot outlining about the structure.

Referring to the drawings 3, represents our invention embodied in a monoplane type of structure, but the same may be carried out in a biplane or other type of structure. The structure as illustrated, is provided with vertical stabilizing fins or members $a$ and $d$. These fins or members are arranged vertically in respect to a central diamond shaped framing $b$, in cross-section, as clearly illustrated in Fig. 2. The vertical fins or members are preferably in form convex-convex.

$c, c$, are carrying wings or planes of the structure in shape preferably in cross-section, convex-convex, as clearly shown in Fig. 2.

$e$, is an elevator arranged in rear of the structure.

$f$, is a rudder or steering device.

$g$, is an engine.

$h$, is an aviator-station, and thereat are located the several means and appliances for controlling the engine and manipulating the elevating and steering devices of the craft.

$i$ and $i^1$, are guy-wires in conical arrangement and in reverse crossing relationship to each other and respectively, at head and base apices $i^2$ and $i^3$, connected with said framing and at base-points $i^4$ and $i^5$, of the same connected with said carrying wings or planes, whereby under such arrangement assisting in the more uniform steadying of the carrying wings or planes $c$, $c$, under whatever variable air current conditions may be encountered, in the flights of the said aeroplane.

The structural arrangement of one of the carrying wings or planes of the aeroplane is illustrated in Fig. 4, and the air currents are represented by dot outlining at $x$, on surfaces thereof, to indicate the coursings of such air currents about the wings or planes $c$, $c$, of the aeroplane.

By the foregoing arrangement of an aeroplane better all around stability both vertically and laterally under most adverse conditions constantly met with is derived, avoiding thereby tendency to drifting, keeling or overturning of the craft.

Having thus described the nature and objects of our said invention, what we claim as new and desire to secure by Letters Patent is:—

In an aeroplane, a centrally arranged diamond shaped framing, stabilizing fins or members arranged vertically and connected at apices with said framing; carrying wings or planes arranged laterally and connected at apices with said framing and guy-wires in conical arrangement and in reverse crossing relationship with each other and respectively, at head and base apices connected with said framing and at base-points of the same in connected relation with said carrying wings or planes, substantially as and for the purposes described.

In witness whereof, we have hereunto set our signatures in the presence of the two subscribing witnesses hereto.

BENJAMIN T. BABBITT HYDE.
ANDREW GAUL, Jr.

Witnesses:
J. H. Mahler,
W. C. Dohn.